United States Patent
Wada (10) Patent No.: US 8,554,402 B2
(45) Date of Patent: *Oct. 8, 2013

(54) METHOD AND APPARATUS FOR DETECTING TIRE HAVING DECREASED INTERNAL PRESSURE, AND PROGRAM FOR DETECTING TIRE HAVING DECREASED INTERNAL PRESSURE

(75) Inventor: Mitsuhiro Wada, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 354 days.

This patent is subject to a terminal disclaimer.

(21) Appl. No.: 12/970,360

(22) Filed: Dec. 16, 2010

(65) Prior Publication Data

US 2011/0288718 A1    Nov. 24, 2011

(30) Foreign Application Priority Data

May 24, 2010    (JP) .................................. 2010-118585

(51) Int. Cl.
*G01M 17/00* (2006.01)
*G06F 7/00* (2006.01)

(52) U.S. Cl.
USPC ........ 701/29.1; 701/29.2; 701/29.3; 701/29.4

(58) Field of Classification Search
USPC .......................................................... 700/29
See application file for complete search history.

(56) References Cited

U.S. PATENT DOCUMENTS

| | | | |
|---|---|---|---|
| 7,136,775 B2 * | 11/2006 | Yanase | 702/140 |
| 7,363,189 B2 * | 4/2008 | Yanase | 702/141 |
| 2007/0032980 A1 * | 2/2007 | Yanase | 702/140 |
| 2011/0190974 A1 * | 8/2011 | Wada | 701/29 |

FOREIGN PATENT DOCUMENTS

| | | |
|---|---|---|
| JP | 63-305011 A | 12/1988 |
| JP | 2005-53263 A | 3/2005 |

* cited by examiner

*Primary Examiner* — Ian Jen
(74) *Attorney, Agent, or Firm* — Birch, Stewart, Kolasch & Birch, LLP (57) ABSTRACT

A method of detecting a tire having a decreased internal pressure by making a relative comparison among wheel speeds of tires attached to the respective wheels, includes detecting wheel rotation information regarding the respective tires of the vehicle; calculating wheel speeds based on the detected wheel rotation information; calculating DEL2 as a decreased pressure determination value by comparison between a front wheel speed and a rear wheel speed; and determining, when the resultant decreased pressure determination value exceeds a predetermined threshold value, that a tire has a decreased internal pressure. The method further includes a threshold value setting step of setting the predetermined threshold value based on (a) a relation obtained in advance, depending on a difference of the mass of the vehicle, between DEL2 and a load sensitivity during a vehicle turning, and (b) a load sensitivity obtained by a turning at the time of determination.

12 Claims, 7 Drawing Sheets

METHOD AND APPARATUS FOR DETECTING TIRE HAVING DECREASED INTERNAL PRESSURE, AND PROGRAM FOR DETECTING TIRE HAVING DECREASED INTERNAL PRESSURE

TECHNICAL FIELD

The present invention relates to a method and an apparatus for detecting a tire having a decreased internal pressure, and a program for detecting a tire having a decreased internal pressure.

BACKGROUND ART

There have been known methods to indirectly detect whether a tire has a decreased air pressure by making a relative comparison among angular velocities of tires attached to a vehicle (see Patent Literature 1 for example).

Furthermore, as a relative comparison method, there has been known a method of using three types of determination values DEL1, DEL2, and DEL3 (see Patent Literature 2 for example). In this method, DEL1 is a wheel speed comparison value obtained from comparison between the wheel speeds of wheels on one diagonal line and the wheel speeds of wheels on the other diagonal line, DEL2 is a wheel speed comparison value obtained from comparison between the wheel speeds of front wheels and the wheel speeds of rear wheels, and DEL3 is a wheel speed comparison value obtained from comparison between the wheel speeds of right-side wheels and the wheel speeds of left-side wheels.

Among the three types of determination values, DEL2 is a wheel speed comparison value obtained from comparison between the wheel speeds of front wheels and the wheel speeds of rear wheels. When two wheel tires of the front axis or the rear axis of a vehicle have a simultaneous deflation, DEL2 changes significantly. Thus, the use of DEL2 described above provides in principle the sensing of two wheels of the same axis having a decreased pressure in the vehicle.

CITATION LIST

Patent Literature

Patent Literature 1: Japanese Unexamined Patent Publication No. 1988-305011
Patent Literature 2: Japanese Unexamined Patent Publication No. 2005-53263

SUMMARY OF INVENTION

Technical Problem

By the way, the above-described method of detecting a tire having a decreased pressure using the determination values uses a principle that a tire having a reduced dynamic loaded radius due to a decreased pressure has a higher wheel speed than the wheel speeds of tires having a normal pressure. However, the tire dynamic loaded radius also changes due to causes other than a decreased pressure. Specifically, when passengers in the vehicle increase or when luggage is placed in the trunk, the load is mainly applied to rear wheels. Thus, even if the rear wheel tires have a normal pressure, the rear wheel tires have a reduced dynamic loaded radius to consequently cause a change in DEL2.

As described above, DEL2 changes not only due to a decreased pressure of a tire but due to a load. Thus, DEL2 has not been conventionally used as an index for determining two rear-axis wheel tires having a decreased pressure.

The present invention has been made in view of the situation as described above. It is an objective of the present invention to provide a method and an apparatus for detecting a tire having a decreased internal pressure and a program for detecting a tire having a decreased internal pressure in which a threshold value considering the influence by a load is set so that DEL2 can be used to determine two rear-axis wheel tires having a decreased pressure.

Solution to Problem (1) In accordance with the present invention, there is provided a method of detecting a tire having a decreased internal pressure (hereinafter simply referred to as "detection method") by making a relative comparison among wheel speeds of tires attached to the respective wheels of a vehicle, comprising:

a step of detecting wheel rotation information regarding the respective tires of the vehicle;

a step of calculating wheel speeds based on the detected wheel rotation information;

a step of calculating a decreased pressure determination value by relative comparison of the calculated wheel speeds; and a step of determining, when the resultant decreased pressure determination value exceeds a predetermined threshold value, that a tire has a decreased internal pressure, wherein the method further comprises a threshold value setting step of setting the predetermined threshold value based on, when assuming that a value of wheel speed comparison between a front wheel speed and a rear wheel speed is DEL2, (a) a relation obtained in advance, depending on a difference of the mass of the vehicle, between DEL2 and a load sensitivity during a vehicle turning, and (b) a load sensitivity obtained by a turning at the time of determination.

(2) In the detection method of (1), the load sensitivity can be calculated by a relational expression between (c) a ratio between a change of a dynamic loaded radius due to a load shift during a turning and a dynamic loaded radius, the ratio being calculated based on a yaw rate obtained from a yaw rate sensor mounted on the vehicle and wheel speeds of left and right rear-axis wheels of the vehicle, and (d) a lateral acceleration obtained from a lateral acceleration sensor mounted on the vehicle or obtained based on a yaw rate from the yaw rate sensor and a driven wheel speed.

(3) In the detection method of (2), when assuming that the tire dynamic loaded radius is DLR, a change of the tire dynamic loaded radius is $\Delta$DLR, a load sensitivity is b, a gravity center height of the vehicle is H, a tread width of the vehicle is W, a vehicle mass is $\underline{m}$, a vehicle lateral acceleration is $a_y$, and a share of the rear $\overline{\text{axis}}$ of the load shift to all axes is $\alpha$, the relational expression is preferably represented as follows:

$$\Delta DLR/DLR = b \times \alpha \times (H/W) \times m \times a_y, \text{ and}$$

the load sensitivity is preferably a typical characteristic value of the load sensitivity represented by $b \times \alpha \times (H/W) \times m$.

(4) In the detection method of (3), a load sensitivity applied to to-be-attached tires during a vehicle turning is preferably the typical characteristic value of the load sensitivity, and a relation according to which the load sensitivity decreases with the increase of the vehicle mass is preferably used to set a predetermined threshold value.

(5) In accordance with the present invention, there is also provided an apparatus for detecting a tire having a decreased internal pressure (hereinafter also may be simply referred to as "detection apparatus") by making a relative comparison among wheel speeds of tires attached to the respective wheels of a vehicle, comprising:

a wheel rotation information detection means for detecting wheel rotation information regarding the respective tires of the vehicle;

a wheel speed calculation means for calculating wheel speeds based on the wheel rotation information detected by the wheel rotation information detection means;

a determination value calculation means for calculating a decreased pressure determination value by relative comparison of the wheel speeds calculated by the wheel speed calculation means; and a determination means for determining, when the resultant decreased pressure determination value exceeds a predetermined threshold value, that a tire has a decreased internal pressure, wherein the apparatus further comprises a threshold value setting means for setting the predetermined threshold value based on, when assuming that a value of wheel speed comparison between a front wheel speed and a rear wheel speed is DEL2, (a) a relation obtained in advance, depending on a difference of the mass of the vehicle, between DEL2 and a load sensitivity during a vehicle turning, and (b) a load sensitivity obtained by a turning at the time of determination.

(6) In the detection apparatus of (5), the load sensitivity can be calculated by a relational expression between (c) a ratio between a change of a dynamic loaded radius due to a load shift during a turning and a dynamic loaded radius, the ratio being calculated based on a yaw rate obtained from a yaw rate sensor mounted on the vehicle and wheel speeds of left and right rear-axis wheels of the vehicle, and (d) a lateral acceleration obtained from a lateral acceleration sensor mounted on the vehicle or obtained based on a yaw rate from the yaw rate sensor and a driven wheel speed.

(7) In the detection apparatus of (6), when assuming that the tire dynamic loaded radius is DLR, a change of the tire dynamic loaded radius is $\Delta$DLR, a load sensitivity is b, a gravity center height of the vehicle is H, a tread width of the vehicle is W, a vehicle mass is $\underline{m}$, a vehicle lateral acceleration is $a_y$, and a share of the rear axis of the load shift to all axes is $\alpha$, the relational expression is preferably represented as follows:

$$\Delta DLR/DLR = b \times \alpha \times (H/W) \times m \times a_y, \text{ and}$$

the load sensitivity is preferably a typical characteristic value of the load sensitivity represented by $b \times \alpha \times (H/W) \times m$.

(8) In the detection apparatus of (7), a load sensitivity applied to to-be-attached tires during a vehicle turning is preferably the typical characteristic value of the load sensitivity, and a relation according to which the load sensitivity decreases with the increase of the vehicle mass is preferably used to set a predetermined threshold value.

(9) In accordance with the present invention, there is further provided a program for detecting a tire having a decreased internal pressure (hereinafter also may be simply referred to as "program") for causing, in order to detect a tire having a decreased internal pressure by making a relative comparison among wheel speeds of tires attached to the respective wheels of a vehicle, a computer to function as:

a wheel speed calculation means for calculating wheel speeds based on wheel rotation information of the respective tires of the vehicle;

a determination value calculation means for calculating a decreased pressure determination value by relative comparison of the wheel speeds calculated by the wheel speed calculation means;

a determination means for determining, when the resultant decreased pressure determination value exceeds a predetermined threshold value, that a tire has a decreased internal pressure, and a threshold value setting means for setting the predetermined threshold value based on, when assuming that a value of wheel speed comparison between a front wheel speed and a rear wheel speed is DEL2, (a) a relation obtained in advance, depending on a difference of the mass of the vehicle, between DEL2 and a load sensitivity during a vehicle turning, and (b) a load sensitivity obtained by a turning at the time of determination.

(10) In the program of (9), the load sensitivity can be calculated by a relational expression between (c) a ratio between a change of a dynamic loaded radius due to a load shift during a turning and a dynamic loaded radius, the ratio being calculated based on a yaw rate obtained from a yaw rate sensor mounted on the vehicle and wheel speeds of left and right rear axis wheels of the vehicle, and (d) a lateral acceleration obtained from a lateral acceleration sensor mounted on the vehicle or obtained based on a yaw rate from the yaw rate sensor and a driven wheel speed.

(11) In the program of (10), when assuming that the tire dynamic loaded radius is DLR, a change of the tire dynamic loaded radius is $\Delta$DLR, a load sensitivity is b, a gravity center height of the vehicle is H, a tread width of the vehicle is W, a vehicle mass is $\underline{m}$, a vehicle lateral acceleration is $a_y$, and a share of the rear axis of the load shift to all axes is $\alpha$, the relational expression is preferably represented as follows:

$$\Delta DLR/DLR = b \times \alpha \times (H/W) \times m \times a_y, \text{ and}$$

the load sensitivity is preferably a typical characteristic value of the load sensitivity represented by $b \times \alpha \times (H/W) \times m$.

(12) In the program of (11), a load sensitivity applied to to-be-attached tires during a vehicle turning is preferably the typical characteristic value of the load sensitivity, and a relation according to which the load sensitivity decreases with the increase of the vehicle mass is preferably used to set a predetermined threshold value.

Advantageous Effects of Invention

According to the detection method and apparatus, and the program of the present invention, by setting a threshold value considering the influence by a load, DEL2 can be used to determine that two rear-axis wheel tires have a decreased pressure.

DESCRIPTION OF EMBODIMENTS

The following section will describe embodiments of a detection method and an apparatus, and a program of the present invention in detail with reference to the attached drawings.

Figure 1:
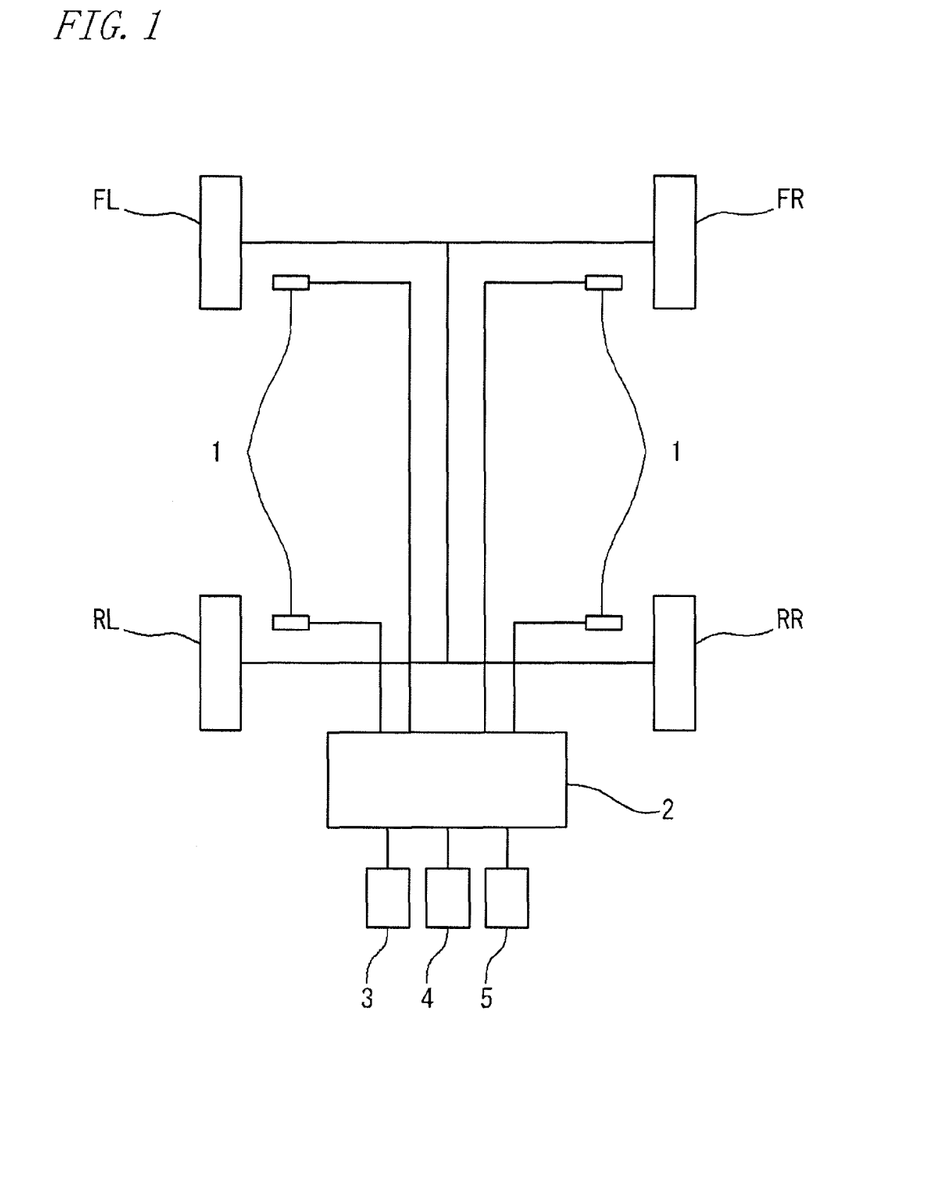
FIG. 1 is a block diagram illustrating one embodiment of a detection apparatus of the present invention.

As shown in FIG. 1, a detection apparatus according to one embodiment of the present invention comprises, in order to detect the wheel rotation information regarding four tires attached to the four-wheel vehicle of FL (left-front wheel), FR (right-front wheel), RL (left-rear wheel), and RR (right-rear wheel), a normal wheel speed detection means (wheel rotation information detection means) 1 that is provided to be associated with the respective tires.

The wheel speed detection means 1 may be, for example, a wheel speed sensor that uses an electromagnetic pickup for example to generate a rotation pulse to measure an angular velocity and a wheel speed based on the number of pulses or an angular velocity sensor such as a one that generates power using rotation as in a dynamo to measure an angular velocity and a wheel speed based on the voltage of the generated power. The output from the wheel speed detection means 1 is given to a control unit 2 that is a computer such as ABS. Connected to the control unit 2 are a display unit 3 comprising a liquid crystal display element, a plasma display element or CRT for example for notifying of a tire having a decreased internal pressure; an initialization button 4 that can be operated by a driver; and an alarm unit 5 for notifying a driver of a tire having a decreased internal pressure. Although not shown, a yaw rate sensor for detecting a yaw rate and a lateral acceleration sensor for detecting a lateral acceleration are mounted on the vehicle.

Figure 2:
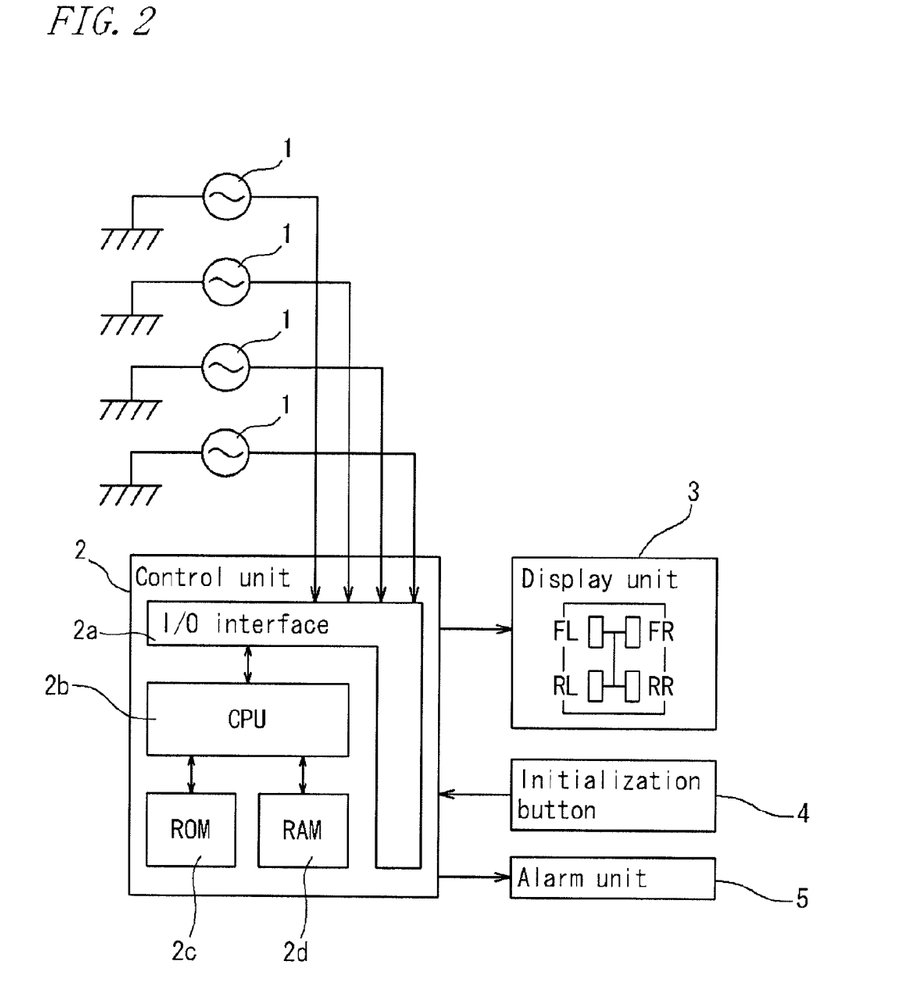
FIG. 2 is a block diagram illustrating an electrical configuration of the detection apparatus shown in FIG. 1.

As shown in FIG. 2, the control unit 2 is composed of: an I/O interface 2a required for the exchange of a signal with an external apparatus; a CPU 2b functioning as a computation processing center; a ROM 2c storing therein a control operation program of the CPU 2b; and a RAM 2d into which data is temporarily written or from which the written data is read out when the CPU 2b performs a control operation.

The wheel speed detection means 1 outputs a pulse signal corresponding to the rotation number of a tire (hereinafter also referred to as "wheel speed pulse"). The CPU 2b calculates, based on the wheel speed pulse outputted from the wheel speed detection means 1, angular velocities of the respective tires at every predetermined sampling cycle $\Delta T(\sec)$ (e.g., $\Delta T = 0.05$ second).

The detection apparatus according to the present embodiment comprises: a wheel speed detection means (wheel rotation information detection means) 1; a wheel speed calculation means for calculating wheel speeds based on the wheel rotation information obtained by the wheel rotation information detection means; a determination value calculation means for calculating a decreased pressure determination value by relative comparison of the wheel speeds calculated by the wheel speed calculation means; a determination means for determining, when the resultant decreased pressure determination value exceeds a predetermined threshold value, that a tire has a decreased internal pressure; and a threshold value setting means for setting the predetermined threshold value based on, when assuming that a value of wheel speed comparison between a front wheel speed and a rear wheel speed is DEL2, (a) a relation obtained in advance, depending on a difference of the mass of the vehicle, between DEL2 and a load sensitivity during a vehicle turning, and (b) a load sensitivity obtained by a turning at the time of determination. The program for detecting a tire having a decreased internal pressure causes the control unit 2 to function as the wheel speed calculation means, the determination value calculation means, the determination means, and the threshold value setting means.

In the present invention, a fact that a load shift occurs between left and right wheels during a vehicle turning is used to calculate a load sensitivity based on the change amount of the dynamic loaded radius due to the load shift. Specifically, a relation can be obtained by calculation as described later between the change of the dynamic loaded radius of the left and right rear-axis wheels in the vehicle during turning and the load shift amount. This relation can be used to automatically determine a threshold value for determining a simultaneous deflation of two rear-axis wheel tires depending on the vehicle mass at the determination.

The load sensitivity is highly dependent on the load. Thus, the load sensitivity rapidly decreases with an increase of the load due to an increase of passengers or luggage in the trunk. The reason is that the tire rigidity is nonlinear.

Figure 3A:
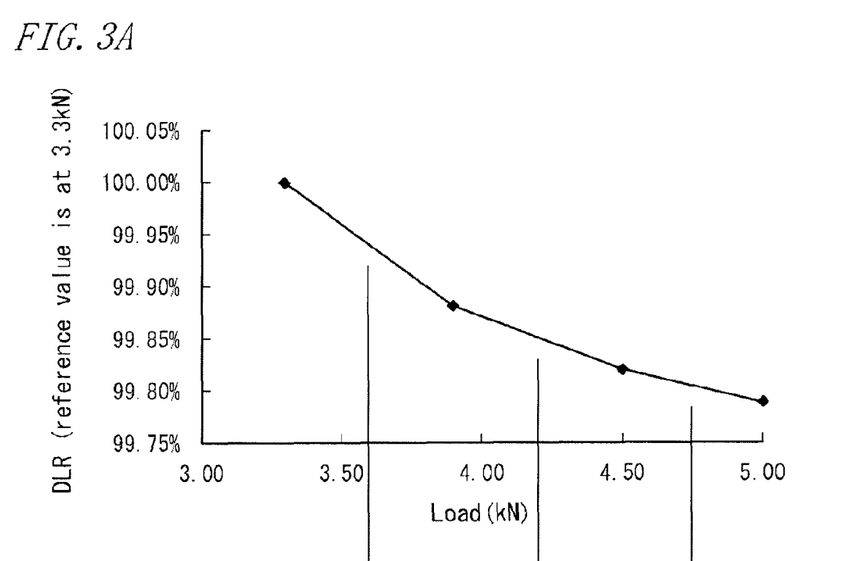
FIG. 3A illustrates an example of a relation between DLR and a load.
Figure 3B:
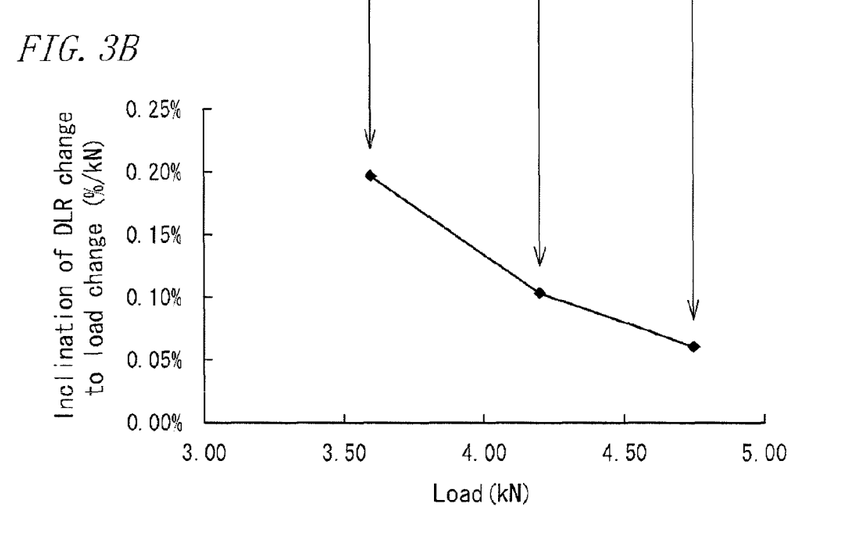
FIG. 3B illustrates a load dependency of a load sensitivity (an inclination of a change of DLR to a load change)

FIGS. 3A and 3B show the result of the measurement of DLR (dynamic loaded radius) on a stand. FIG. 3A illustrates the relation between DLR and the load. FIG. 3B illustrates the load dependency of a load sensitivity (an inclination of a change of DLR to a load change). In the experiment, the vehicle was applied with loads of 3.30 kN, 3.90 kN, 4.50 kN, and 5.00 kN and DLR was measured during the respective load applications. In FIG. 3A, the vertical axis is based on a reference value of a dynamic loaded radius when a load of 3.30 kN was applied and shows a ratio (%) to this reference value.

As can be seen from FIG. 3A and FIG. 3B, when the reference load is low, the dynamic loaded radius significantly changes to the load fluctuation. When the reference load is high on the other hand, the dynamic loaded radius changes relatively mildly. In other words, it can be seen that a low load results in a high load sensitivity and a high load results in a low load sensitivity. Thus, it can be seen that, by estimating the load sensitivity during a vehicle turning, a high load sensitivity indicates that the current vehicle mass is low and a low load sensitivity indicates that the current vehicle mass is high. In the present invention, a relation according to which the load sensitivity decreases with the increase of the vehicle mass is used to set a predetermined threshold value depending on the vehicle mass.

The threshold value of DEL2 for determining a decreased internal pressure can be determined, for example, based on the decrease of the dynamic loaded radius of a tire when the tire has a 20% or 25%-decreased pressure. This DEL2 is a comparison value between a front wheel speed and a rear wheel speed and can be determined, as shown in the following formula (1) for example, as a value obtained by dividing a difference between the sum of the wheel speeds of the front wheel tires and the sum of the wheel speeds of the rear wheel tires (a difference between the two sums) by an average wheel speed of the four wheel tires.

$$\text{DEL2} = \{((\omega_1 + \omega_2) - (\omega_3 + \omega_4)\} / \omega_{mean} \quad (1)$$

In the formula, $\omega_1$, $\omega_2$, $\omega_3$ and $\omega_4$ represent the wheel speeds of the left front wheel tire, the right front wheel tire, the left rear wheel tire, and the right rear wheel tire, respectively. $\omega_{mean}$ mean represents an average wheel speed of the four wheel tires. It is noted that DEL2 also can be represented by other formulae than the formula (1) so long as DEL2 is a comparison value between a front wheel speed and a rear wheel speed.

The present inventor has derived a method of setting a threshold value considering the influence by a load through various investigations for finding a method of accurately determining a simultaneous deflation of two rear-axis wheel tires regardless of the magnitude of the vehicle mass.

[Method of Detecting Decreased Internal Pressure]

The following section will describe a detection method of the present invention.

(1) First, based on an output signal (pulse signal) from the wheel speed detection means 1, the angular velocities ($\omega$) of the respective tires are calculated by the following formula (2).

$$\text{Angular velocity}(\omega) = 2\pi \times \text{Freq}(Hz)/N(\text{number of teeth}) \quad (2)$$

In the formula, N represents the number of teeth per one rotation of the vehicle axis of the wheel speed detection means 1. Freq(Hz) represents a value obtained by counting the teeth of the wheel speed detection means 1 per one second.

The tire dynamic loaded radius also changes depending on factors other than a decreased internal pressure of a tire such as acceleration and deceleration, turning, or ramp running. Thus, it is preferable that the vehicle running status is limited (or limited to a running status where the vehicle is running straight on a flat road with a fixed speed) so that data obtained in the limited status as described above is used as effective data. This limitation can exclude a change of the tire dynamic loaded radius due to other factors from the data for determining a decreased internal pressure to thereby determine a decreased internal pressure accurately.

Specifically, whether running conditions satisfy conditions for a fixed speed running, a flat road running, and straight running or not is compared with the respective determination conditions. Then, it is determined whether data obtained through an actual running is data suitable for calculating a determination value or not. When the data is inappropriate data, the data is not used as data for calculating a determination value and is excluded. Determination conditions may be, for example, a vehicle front-and-rear direction |G|<0.05 G, an orientation change of 1 degree or less, a road surface pitch of 5% or less, and no braking.

(2) Next, DEL2 for determining a decreased pressure is calculated based on the formula (1) for example.

The DEL2 can be accumulated in a predetermined number and the average value thereof can be used to determine a decreased internal pressure of a tire. In this case, the use of the average value can improve the determination accuracy. Alternatively, the variation of DEL2 accumulated in a predetermined number also can be determined by population variance so that a DEL2 average value is calculated when a variation value ($\sigma^2$) is smaller than a criterion value.

(3) Next, the calculated DEL2 is compared with the predetermined threshold value set by the threshold value setting means. If the DEL2 is higher than the threshold value, it is judged that the two rear-axis wheel tires have a decreased internal pressure. Then, a decreased pressure is displayed by the display unit 3 and an alarm is issued by the alarm unit 5 to notify the driver.

[Method of Setting Threshold Value]

In order to set the threshold value of DEL2, the first step is to perform an actual vehicle experiment (tuning) to thereby obtain the relation between DEL2 and a load sensitivity during a vehicle turning depending on a difference of the mass of the vehicle. In other words, the relation between DEL2 and a load sensitivity during a vehicle turning is obtained with different vehicle masses. This load sensitivity can be calculated by the formula (8) (which will be described later) for example as an inclination of an approximate line (coefficient=$\alpha \times b \times (H/W) \times m \times (DLR/2)$) for which the horizontal axis is $(\omega_R + \omega_L)\theta'$ and the vertical axis is $\Delta DLR/DLR$. The coefficient changes depending on the load sensitivity $b \times m$. Thus, this can be assumed as a typical load sensitivity characteristic value. In the present specification, the term "load sensitivity" may include not only a mere load sensitivity but also a value which changes depending on this load sensitivity (which is a parameter consisting of the load sensitivity and a value uniquely fixed in the vehicle).

When the vehicle reference mass (only the driver is on the vehicle, no luggage) is 1600 kg, the maximum mass (at the maximum loading) is 2000 kg, the reference internal pressure is 200 kPa, and an alarm is issued at a threshold value of a 20%-or-more decreased pressure, the turning running needs to be carried out based on at least four types of running conditions as shown below.

Condition 1: Reference mass (1600 kg), reference internal pressure (200 kPa)

Condition 2: Reference mass (1600 kg), two rear-axis wheel tires having a 20%-decreased pressure (160 kPa)

Condition 3: Maximum mass (2000 kg), reference internal pressure (200 kPa)

Condition 4: Maximum mass (2000 kg), two rear-axis wheel tires having a 20%-decreased pressure (160 kPa)

Individual tires are different to one another (the variation of DLR due to the difference among the individual tires). In order to exclude the influence by this difference among the individual tires, data obtained at the time of a reference internal pressure is required. During tuning, DEL2 at a reference internal pressure and a reference load is assumed as a reference DEL2. DEL2 under other conditions is corrected by deducting the reference DEL2. In the actual market, initialization is firstly performed with the reference internal pressure and an unknown load. Thus, the load sensitivity obtained at the initialization is used to correct DEL2 at the initialization. Specifically, the straight line connecting A and C of FIG. 6 obtained during the tuning shows the possible range of DEL2 at the reference internal pressure. Specifically, DEL2 is corrected so that a point on the straight line AC corresponding to the load sensitivity at the initialization is DEL2 at the initialization.

Figure 6:
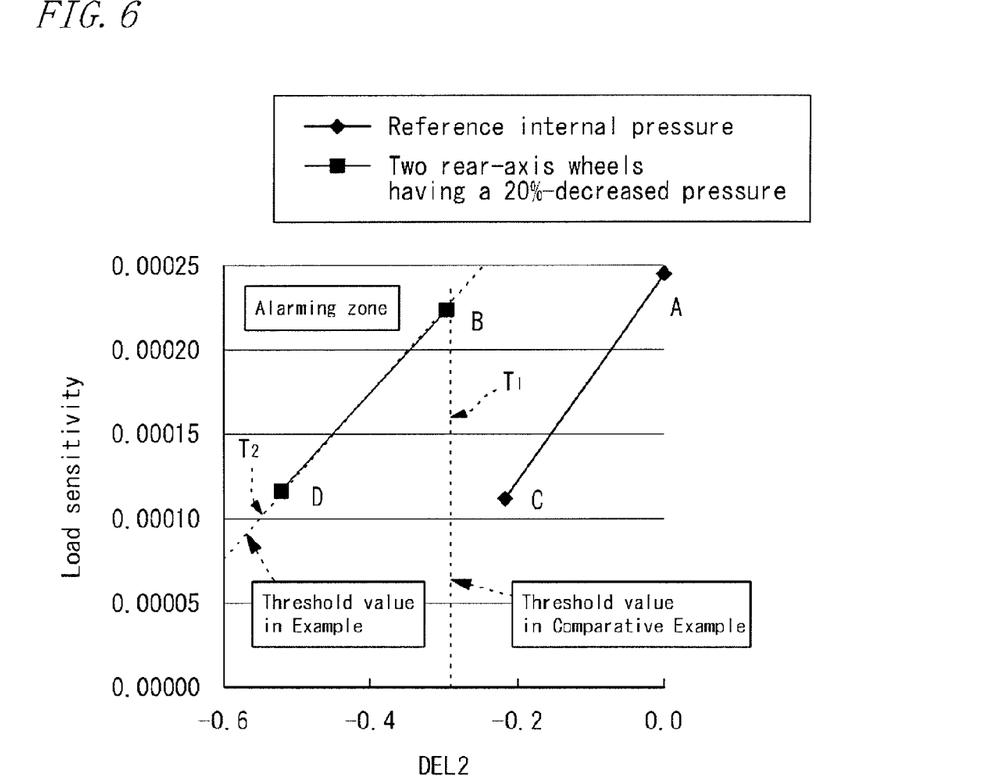
FIG. 6 illustrates a relation between DEL2 and the load sensitivity during tuning.

Thereafter, in a determination mode, the fluctuation of the point from the point on the line AC (DEL2, load sensitivity) may be considered in a relative manner. By doing so, the variation of DEL2 depending on a difference among the individual tires and the influence by the load during the initialization can be both excluded.

Then, when assuming that the horizontal axis shows DEL2 and the vertical axis shows the load sensitivity, a straight line connecting the point obtained under the condition 2 to the point obtained under the condition 4 can be assumed as a threshold value line (see FIG. 6). Then, based on the load sensitivity obtained at the actual running (at the determination and regardless of the vehicle mass), the DEL2 value determined by the threshold value line can be assumed as the "threshold value" of DEL2 at the determination. By comparing this "threshold value" with DEL2 at the determination, it can be determined whether two rear-axis wheel tires of the vehicle have a simultaneous deflation or not.

The tuning also can be performed by a mass between the reference mass and the maximum mass. In this case, although the threshold value can be set more minutely, by obtaining the point of the reference mass and the point of the maximum mass in an actual case, a mass therebetween can be estimated by interpolation. Thus, the tuning may be carried out for at least two points. In the case of a normal passenger vehicle, the range of the minimum mass (reference mass) and the maximum mass is from about 300 to about 400 kg. This range may be appropriately set depending on the vehicle.

[Relation Between the Changes of the Dynamic Loaded Radii of Left and Right Driven Wheels During Turning and the Load Shift Amount]

Figure 4:
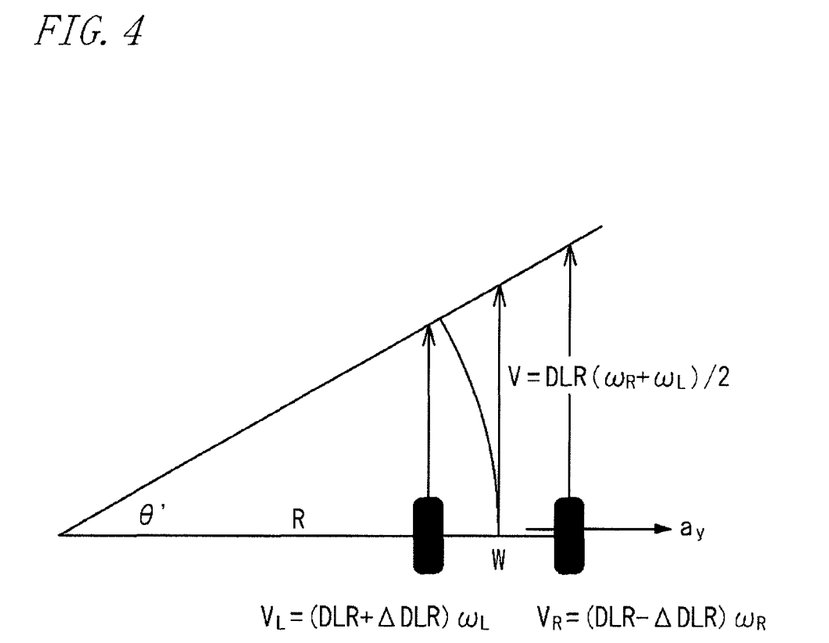
FIG. 4 illustrates the relation between the ground speeds of inner and outer wheels and the vehicle speed during left turning.
Figure 5:
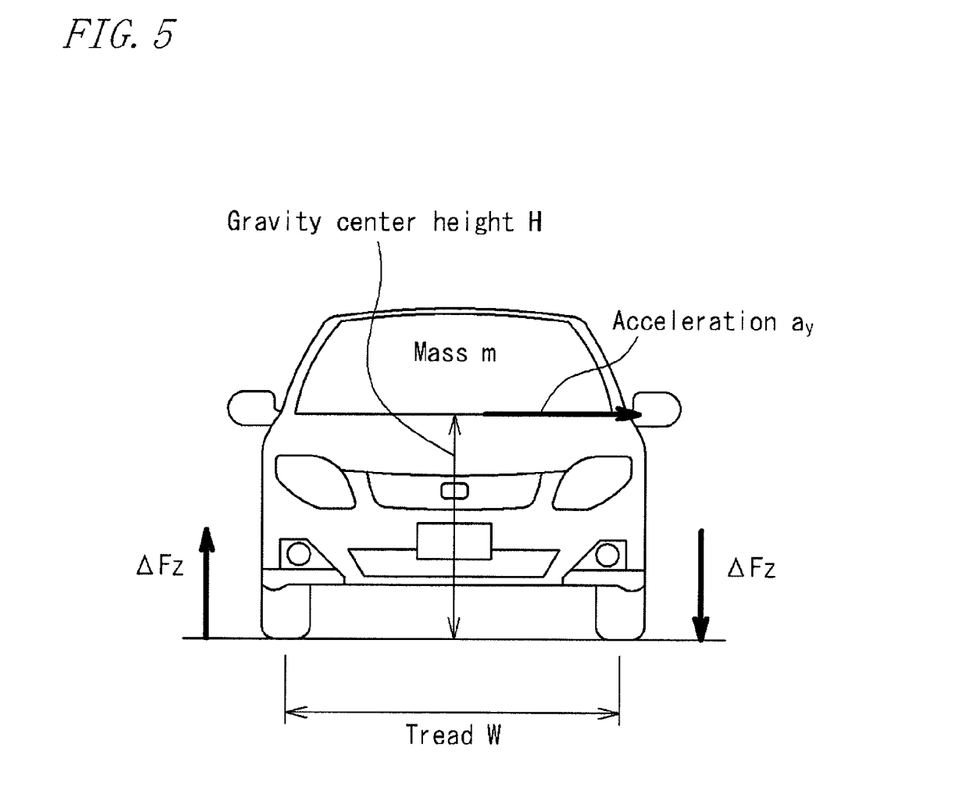
FIG. 5 illustrates vehicle various parameters.

Next, the following section will describe the relation between the changes of the dynamic loaded radii of left and right driven wheels during the turning running and the load shift amount regarding a front-wheel drive vehicle with reference to FIG. 4 to FIG. 5.

First, as shown in FIG. 4, a situation is assumed where the vehicle turns in the left direction on the circumference having the radius R. The vehicle includes therein a yaw rate sensor for detecting a yaw rate ($\theta'$) and/or a lateral acceleration sensor for detecting a lateral acceleration ($a_y$). The respective detection signals are sent to the control unit 2.

Then, the relation between the respective sensor values and the turning radius R can be represented by $\theta'=V/R$ and $a_y=V^2/R$.

When assuming that the outer wheel (right wheel) has a ground speed $V_R$, the inner wheel (left wheel) has a ground speed $V_L$, and the tread width is W, the following formulae can be established.

$(R+W/2) \times \theta' = V_R$ $(R-W/2) \times \theta' = V_L$

Thus, the yaw rate ($\theta'$) is represented by the following formula (3). The vehicle speed (V) is represented by the following formula (4).

$$\theta' = \frac{(V_R - V_L)}{W} \quad (3)$$

$$V = (V_R + V_L)/2 \quad (4)$$

Then, based on the formulae (3) and (4), the formula (5) can be introduced in the manner as described below. Here, the ground speeds $V_L$ and $V_R$ are represented as shown below based on the wheel speed ($\omega$) and the dynamic loaded radius (DLR).

$V_L = (DLR + \Delta DLR) \times \omega_L$ $V_R = (DLR - \Delta DLR) \times \omega_R$ Here, the sum of the ground speeds $V_L$ and $V_R$ ($V_R + V_L$) is as shown below.

$V_R + V_L = (DLR + \Delta DLR) \times \omega_L + (DLR - \Delta DLR) \times \omega_R = DLR(\omega_R + \omega_L) - \Delta DLR(\omega_R - \omega_L)$ Since $\Delta DLR (\omega_R - \omega_L) \approx 0$ is established, $V_R + V_L \approx DLR (\omega_R - \omega_L)$ can be established.

$$1/R = \theta'/V \quad (5)$$

$$= \frac{(V_R - V_L)/W}{(V_R + V_L)/2}$$

$$= \frac{2}{W} \frac{(DLR - \Delta DLR)\omega_R - (DLR + \Delta DLR)\omega_L}{DLR(\omega_R + \omega_L)}$$

-continued $$= \frac{2}{W} \frac{DLR(\omega_R - \omega_L) - \Delta DLR(\omega_R + \omega_L)}{DLR(\omega_R + \omega_L)}$$

$$= \frac{2}{W} \left( \left( \frac{(\omega_R - \omega_L)}{(\omega_R + \omega_L)} \right) - \frac{\Delta DLR}{DLR} \right)$$

Furthermore, since the vehicle speed (V) is represented by $DLR(\omega_R + \omega_L)/2$, $\theta'/V$ can be represented by the following formula.

$$\theta'/V = \frac{2\theta'}{DLR(\omega_R + \omega_L)} \quad (6)$$

Then, based on the formula (6) and the formula (5), the following formula (7) can be introduced.

$$\frac{2\theta'}{DLR(\omega_R + \omega_L)} = \frac{2}{W} \left( \left( \frac{(\omega_R - \omega_L)}{(\omega_R + \omega_L)} \right) - \frac{\Delta DLR}{DLR} \right) \quad (7)$$

$$\therefore \frac{\Delta DLR}{DLR} = \left( \frac{(\omega_R - \omega_L)}{(\omega_R + \omega_L)} \right) - \frac{W\theta'}{DLR(\omega_R + \omega_L)}$$

Then, ($\Delta DLR/DLR$) in the formula (7) is proportional to the load shift amount ($\Delta Fz$, see FIG. 5). When assuming that the load sensitivity is b and the load shift share of the rear axis to all axes is $\alpha$ ($0 < \alpha \leq 1$), ($\Delta DLR/DLR$) is represented by the following formula (8).

$$\frac{\Delta DLR}{DLR} = \alpha \cdot b \cdot \Delta Fz \quad (8)$$

$$= \left[ \alpha \cdot b \left( \frac{H}{W} \right) m \right] \cdot a_y$$

$$= \left[ \alpha \cdot b \left( \frac{H}{W} \right) m \right] \frac{DLR}{2} (\omega_R + \omega_L) \theta'$$

The load shift share $\alpha$, the gravity center height of the vehicle (H), the tread width (W), and the mass (m) are basically determined uniquely for the same vehicle. Thus, the coefficient of $(\omega_R + \omega_L)\theta'$ increases with the increase of bm of the tire.

When the vehicle having an empty vehicle mass of 1600 kg accommodates persons or luggage of about 400 kg, the vehicle mass increases by about 25% and the rear wheel load increases by about 2 kN. Thus, the value b decreases by 50% or more from about 0.2 to 0.1 or less as shown in FIG. 3B. Thus, the value b×m consequently decreases with the increase of the load. Thus, by using the coefficient of $(\omega_R - \omega_L)/\theta'$ in the formula (8) as a typical load sensitivity characteristic value, the coefficient can be used as an index for determining the increase of the vehicle load.

Example

Next, the following section will describe an Example of the detection method of the present invention. However, the present invention is not limited to such an Example only.

In order to obtain the rotating angular velocities of the respective tires attached to the vehicle, the rotation speed information used for ABS control was converted to rotating angular velocities. In order to obtain a vehicle yaw rate, a sensor was attached to a predetermined position of the vehicle. The obtained rotating angular velocities and vehicle yaw rate are outputted as serial data directly to a PC (personal computer) and can be inputted as digital data to the PC every 40 msec.

The experiment was carried out with a FF (front-engine, front-wheel drive layout) vehicle with the reference internal pressure of 200 kPa and the tire size of 215/60R17.

Tuning

In the Okayama test course of Sumitomo Rubber Industries, Ltd., the tuning was carried out under the following four conditions to calculate the load sensitivity and DEL2. In the present Example, such a threshold value was determined so as to issue an alarm when a 20%-or-more decreased pressure is reached. The load sensitivity was calculated by the formula (8) as an inclination of the approximate line for which the horizontal axis was $(\omega_R+\omega_L)/\theta'$ and the vertical axis was $\Delta$DLR/DLR. Then, $\Delta$DLR/DLR was calculated by the formula (5). DLR of the right formula of the formula (5) was given as an initial value. The DLR in an actual case changes depending on the influence by the load or the fluctuation of the internal pressure with a change rate of at most 0.3%. Thus, even when this DLR is given as an initial value (fixed value), substantially no influence is caused on the accuracy of the determination.

Condition A: Reference mass (1600 kg), reference internal pressure (200 kPa)
Condition B: Reference mass (1600 kg), two rear-axis wheel tires having a 20%-decreased pressure (160 kPa)
Condition C: Maximum mass (2000 kg), reference internal pressure (200 kPa)
Condition D: Maximum mass (2000 kg), two rear-axis wheel tires having a 20%-decreased pressure (160 kPa)

The result is shown in Table 1 and FIG. 6. In FIG. 6, the broken line $T_1$ shows a threshold value (fixed value) set by the conventional method and is about −0.3. In FIG. 6, the broken line $T_2$ shows the threshold value line set by the detection method of the present invention and this threshold value line is a straight line passing through the point obtained based on the condition B and the point obtained based on the condition D. The left region from this threshold value line is an alarming zone.

TABLE 1

| Conditions | DEL2 | Load sensitivity |
|---|---|---|
| A | 0.000 | 0.000245 |
| B | −0.297 | 0.000223 |
| C | −0.219 | 0.000112 |
| D | −0.520 | 0.000116 |

Determination Experiment

Next, the turning running was carried out under the following six conditions to check a false alarm and no alarm.
Condition a: Reference mass (1600 kg), reference internal pressure (200 kPa)
Condition b: Reference mass (1600 kg), two rear-axis wheel tires having a 10%-decreased pressure (180 kPa)
Condition c: Reference mass (1600 kg), two rear-axis wheel tires having a 25%-decreased pressure (150 kPa)
Condition d: Maximum mass (2000 kg), reference internal pressure (200 kPa)
Condition e: Maximum mass (2000 kg), two rear-axis wheel tires having a 10%-decreased pressure (180 kPa)
Condition f: Maximum mass (2000 kg), two rear-axis wheel tires having a 25%-decreased pressure (150 kPa)

Figure 7:
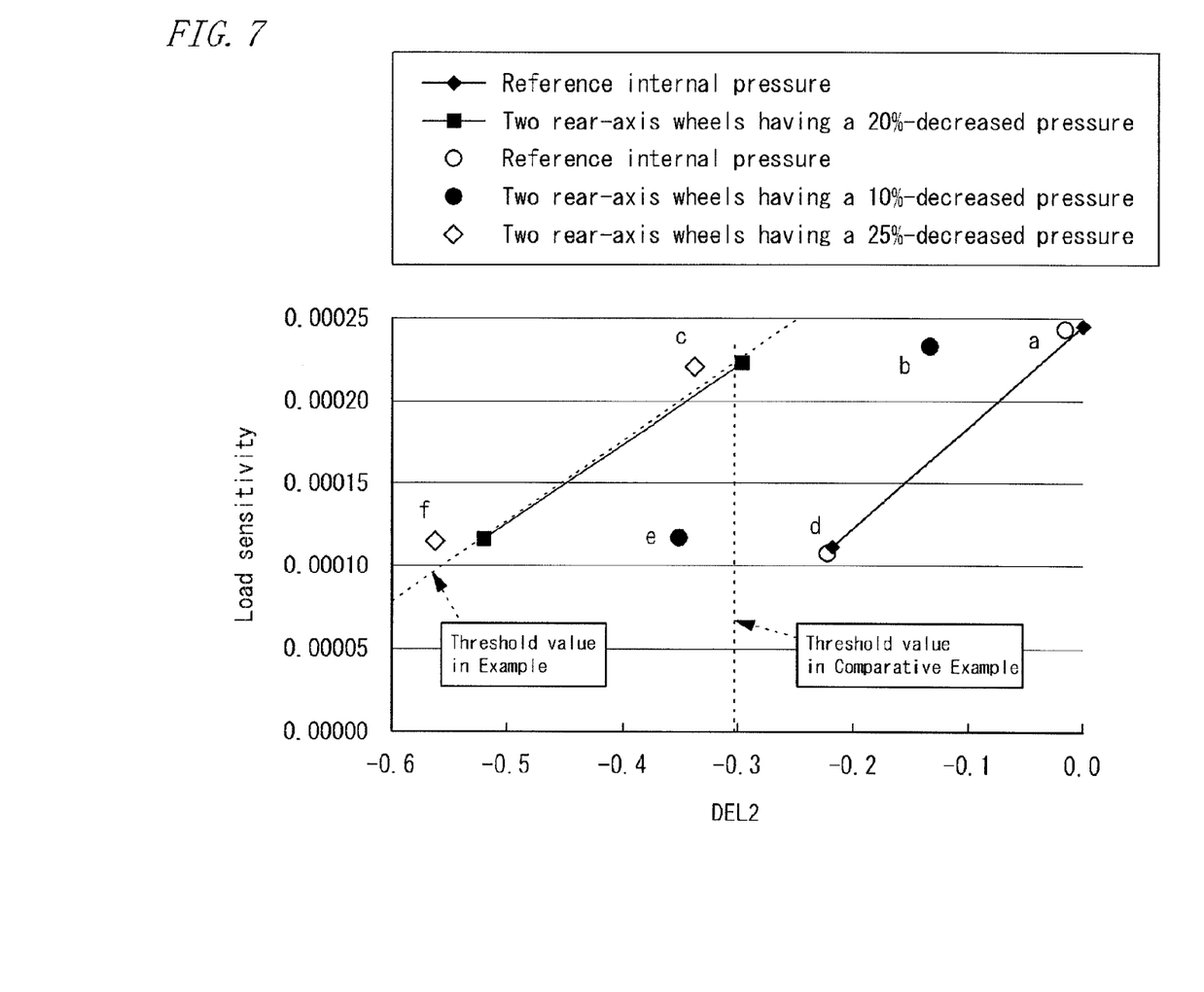
FIG. 7 illustrates a relation between DEL2 and a load sensitivity in a determination experiment.

The result is shown in Table 2 and FIG. 7.

TABLE 2

| Conditions | DEL2 | Load sensitivity | Example | | Comparative example | |
|---|---|---|---|---|---|---|
| a | −0.016 | 0.000243 | — | OK | — | OK |
| b | −0.133 | 0.000233 | — | OK | — | OK |
| c | −0.337 | 0.000221 | Alarm | OK | Alarm | OK |
| d | −0.223 | 0.000107 | — | OK | — | OK |
| e | −0.351 | 0.000117 | — | OK | Alarm | NG |
| f | −0.562 | 0.000116 | Alarm | OK | Alarm | OK |

In the Example, determination was correctly made with regard to all of the six conditions. In the case of the Comparative Example according to the conventional method on the other hand, an alarm was issued for the condition e in spite of a decreased pressure by lower than 20% (a 10%-decreased pressure). Since the Comparative Example does not provide a threshold value for which the influence by the vehicle mass is taken into consideration, the influence by the decreased dynamic loaded radius due to the load presumably acted on the DEL2 value at the determination.

What is claimed is:

1. A method of detecting a tire having a decreased internal pressure by making a relative comparison among wheel speeds of tires attached to respective wheels of a vehicle, comprising:
   a step of detecting wheel rotation information regarding the respective tires of the vehicle;
   a step of calculating wheel speeds based on the detected wheel rotation information;
   a step of calculating DEL2 as a decreased pressure determination value by comparison between a front wheel speed and a rear wheel speed; and
   a step of determining, when the resultant decreased pressure determination value exceeds a predetermined threshold value, that a tire has a decreased internal pressure,
   wherein the method further comprises a threshold value setting step of setting the predetermined threshold value based on
   (a) a relation obtained in advance, depending on a difference of the mass of the vehicle, between DEL2 and a load sensitivity during a vehicle turning, and
   (b) the load sensitivity obtained by a turning at the time of determination.

2. The method of detecting a tire having a decreased internal pressure according to claim 1, wherein the load sensitivity is calculated by a relational expression between
   (c) a ratio between a change of a dynamic loaded radius due to a load shift during a turning and a dynamic loaded radius, the ratio being calculated based on a yaw rate obtained from a yaw rate sensor mounted on the vehicle and wheel speeds of left and right rear-axis wheels of the vehicle, and
   (d) a lateral acceleration obtained from a lateral acceleration sensor mounted on the vehicle or obtained based on a yaw rate from the yaw rate sensor and a driven wheel speed.

3. The method of detecting a tire having a decreased internal pressure according to claim 2, wherein, when assuming that the tire dynamic loaded radius is DLR, a change of the tire dynamic loaded radius is $\Delta$DLR, a load sensitivity is b, a gravity center height of the vehicle is H, a tread width of the vehicle is W, a vehicle mass is m, a vehicle lateral acceleration is $a_y$, and a share of the rear axis of the load shift to all axes is $\alpha$, the relational expression is represented as follows:

$$\Delta DLR/DLR = b \times \alpha \times (H/W) \times m \times a_y, \text{ and}$$

the load sensitivity is a typical characteristic value of the load sensitivity represented by b×α×(H/W)×m.

4. The method of detecting a tire having a decreased internal pressure according to claim 3, wherein a load sensitivity applied to to-be-attached tires during a vehicle turning is the typical characteristic value of the load sensitivity, and a relation according to which the load sensitivity decreases with the increase of the vehicle mass is used to set a predetermined threshold value.

5. An apparatus for detecting a tire having a decreased internal pressure by making a relative comparison among wheel speeds of tires attached to respective wheels of a vehicle, comprising:
　a wheel rotation information detection device configured to detect wheel rotation information regarding the respective tires of the vehicle;
　a wheel speed calculation device configured to calculate wheel speeds based on the wheel rotation information detected by the wheel rotation information detection device;
　a determination value calculation device configured to calculate DEL2 as a decreased pressure determination value by comparison between a front wheel speed and a rear wheel speed; and
　a determination device configured to determine, when the resultant decreased pressure determination value exceeds a predetermined threshold value, that a tire has a decreased internal pressure,
　wherein the apparatus further comprises a threshold value setting device configured to set the predetermined threshold value based on,
　(a) a relation obtained in advance, depending on a difference of the mass of the vehicle, between DEL2 and a load sensitivity during a vehicle turning, and
　(b) the load sensitivity obtained by a turning at the time of determination.

6. The apparatus for detecting a tire having a decreased internal pressure according to claim 5, wherein the load sensitivity is calculated by a relational expression between
　(c) a ratio between a change of a dynamic loaded radius due to a load shift during a turning and a dynamic loaded radius, the ratio being calculated based on a yaw rate obtained from a yaw rate sensor mounted on the vehicle and wheel speeds of left and right rear-axis wheels of the vehicle, and
　(d) a lateral acceleration obtained from a lateral acceleration sensor mounted on the vehicle or obtained based on a yaw rate from the yaw rate sensor and a driven wheel speed.

7. The apparatus for detecting a tire having a decreased internal pressure according to claim 6, wherein, when assuming that the tire dynamic loaded radius is DLR, a change of the tire dynamic loaded radius is ΔDLR, a load sensitivity is b, a gravity center height of the vehicle is H, a tread width of the vehicle is W, a vehicle mass is m, a vehicle lateral acceleration is $a_y$, and a share of the rear axis of the load shift to all axes is α, the relational expression is represented as follows:

$$\Delta DLR/DLR = b \times \alpha \times (H/W) \times m \times a_y,$$

and the load sensitivity is a typical characteristic value of the load sensitivity represented by b×α×(H/W)×m.

8. The apparatus for detecting a tire having a decreased internal pressure according to claim 7, wherein a load sensitivity applied to to-be-attached tires during a vehicle turning is the typical characteristic value of the load sensitivity, and a relation according to which the load sensitivity decreases with the increase of the vehicle mass is used to set a predetermined threshold value.

9. A computer program product embodied on a non-transitory computer readable medium for detecting a tire having a decreased internal pressure for causing, in order to detect a tire having a decreased internal pressure by making a relative comparison among wheel speeds of tires attached to respective wheels of a vehicle, a computer to perform the steps of:
　calculating wheel speeds based on wheel rotation information of the respective tires of the vehicle;
　calculating DEL2 as a decreased pressure determination value by comparison between a front wheel speed and a rear wheel speed;
　a determining, when the resultant decreased pressure determination value exceeds a predetermined threshold value, that a tire has a decreased internal pressure, and
　setting the predetermined threshold value based on
　(a) a relation obtained in advance, depending on a difference of the mass of the vehicle, between DEL2 and a load sensitivity during a vehicle turning, and
　(b) the load sensitivity obtained by a turning at the time of determination.

10. The computer program product for detecting a tire having a decreased internal pressure according to claim 9, wherein the load sensitivity is calculated by a relational expression between
　(c) a ratio between a change of a dynamic loaded radius due to a load shift during a turning and a dynamic loaded radius, the ratio being calculated based on a yaw rate obtained from a yaw rate sensor mounted on the vehicle and wheel speeds of left and right rear axis wheels of the vehicle, and
　(d) a lateral acceleration obtained from a lateral acceleration sensor mounted on the vehicle or obtained based on a yaw rate from the yaw rate sensor and a driven wheel speed.

11. The computer program product for detecting a tire having a decreased internal pressure according to claim 10, wherein, when assuming that the tire dynamic loaded radius is DLR, a change of the tire dynamic loaded radius is ΔDLR, a load sensitivity is b, a gravity center height of the vehicle is H, a tread width of the vehicle is W, a vehicle mass is m, a vehicle lateral acceleration is $a_y$, and a share of the rear axis of the load shift to all axes is α, the relational expression is represented as follows:

$$\Delta DLR/DLR = b \times \alpha \times (H/W) \times m \times a_y,$$ and the load sensitivity is a typical characteristic value of the load sensitivity represented by b×α×(H/W)×m.

12. The computer program product for detecting a tire having a decreased internal pressure according to claim 11, wherein a load sensitivity applied to to-be-attached tires during a vehicle turning is the typical characteristic value of the load sensitivity, and a relation according to which the load sensitivity decreases with the increase of the vehicle mass is used to set a predetermined threshold value.

* * * * *